July 9, 1940.  W. M. BAYLEY ET AL  2,207,370
UNIVERSAL SAWING AND MITER CUTTING MACHINE
Filed June 14, 1937  3 Sheets-Sheet 1
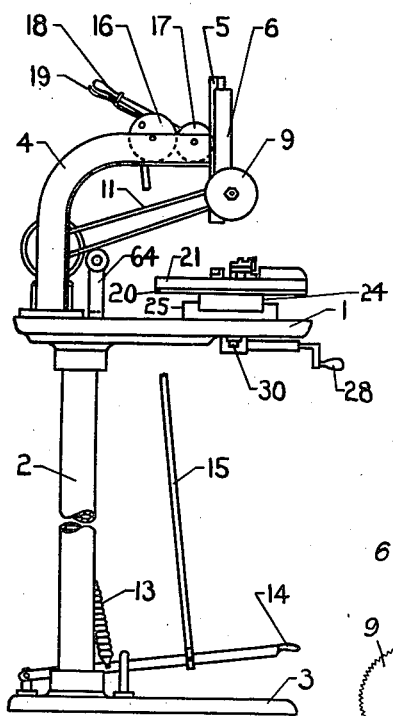
Fig. 1
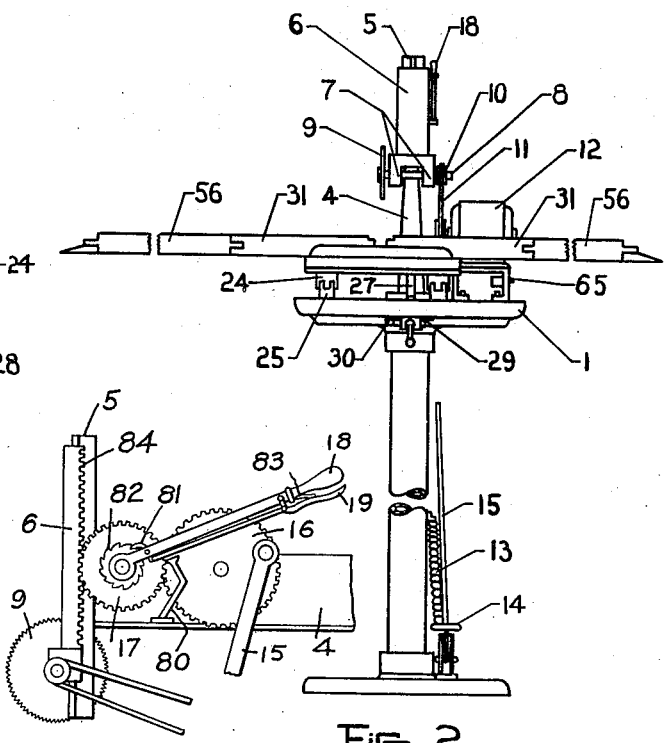
Fig. 2
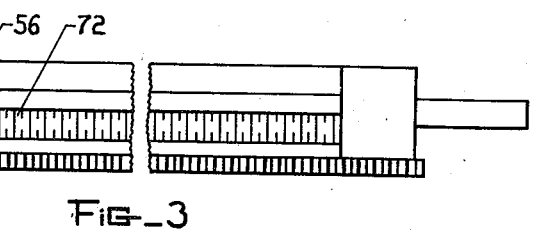
Fig. 13
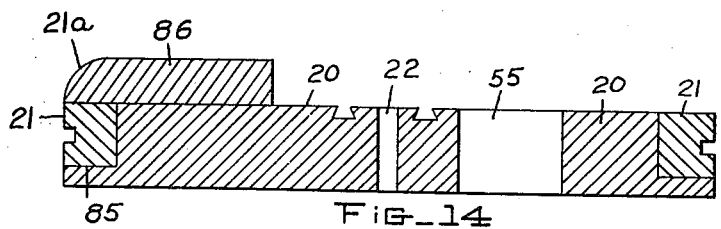
Fig. 3
Fig. 14
INVENTORS
W. M. Bayley
B. E. Hayes
BY Roy A. Plant
ATTORNEY July 9, 1940.     W. M. BAYLEY ET AL     2,207,370
UNIVERSAL SAWING AND MITER CUTTING MACHINE
Filed June 14, 1937     3 Sheets-Sheet 2
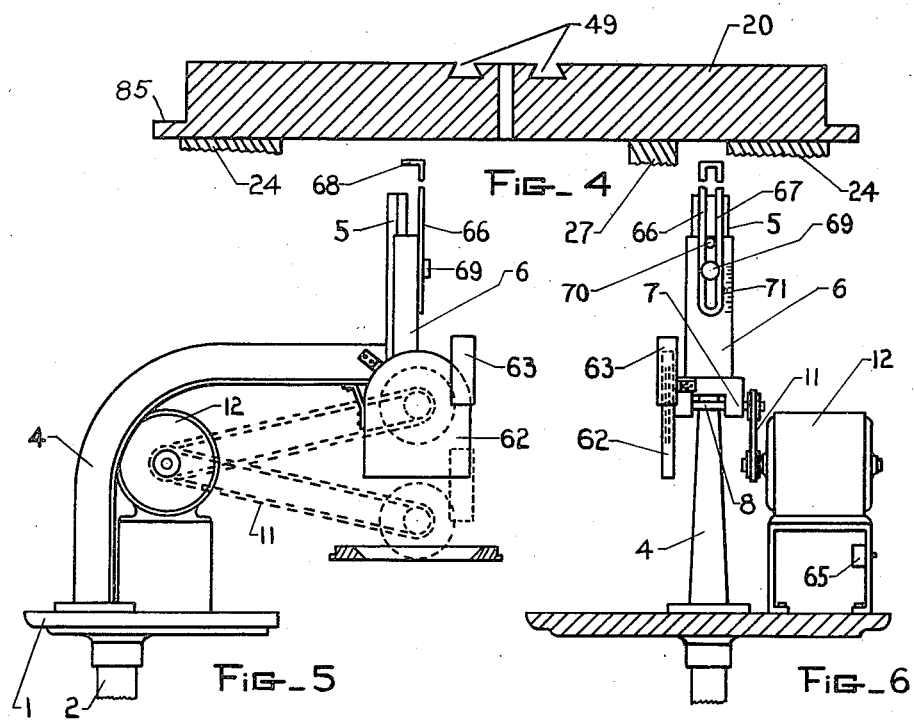
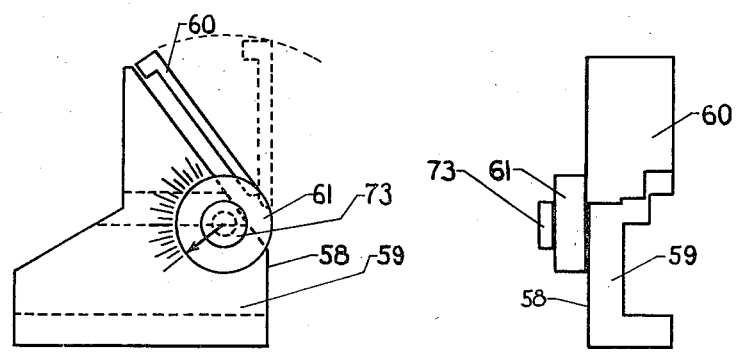
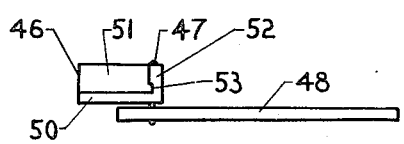
INVENTORS
W.M. Bayley
B.E. Hayes
BY Roy A. Plant
ATTORNEY

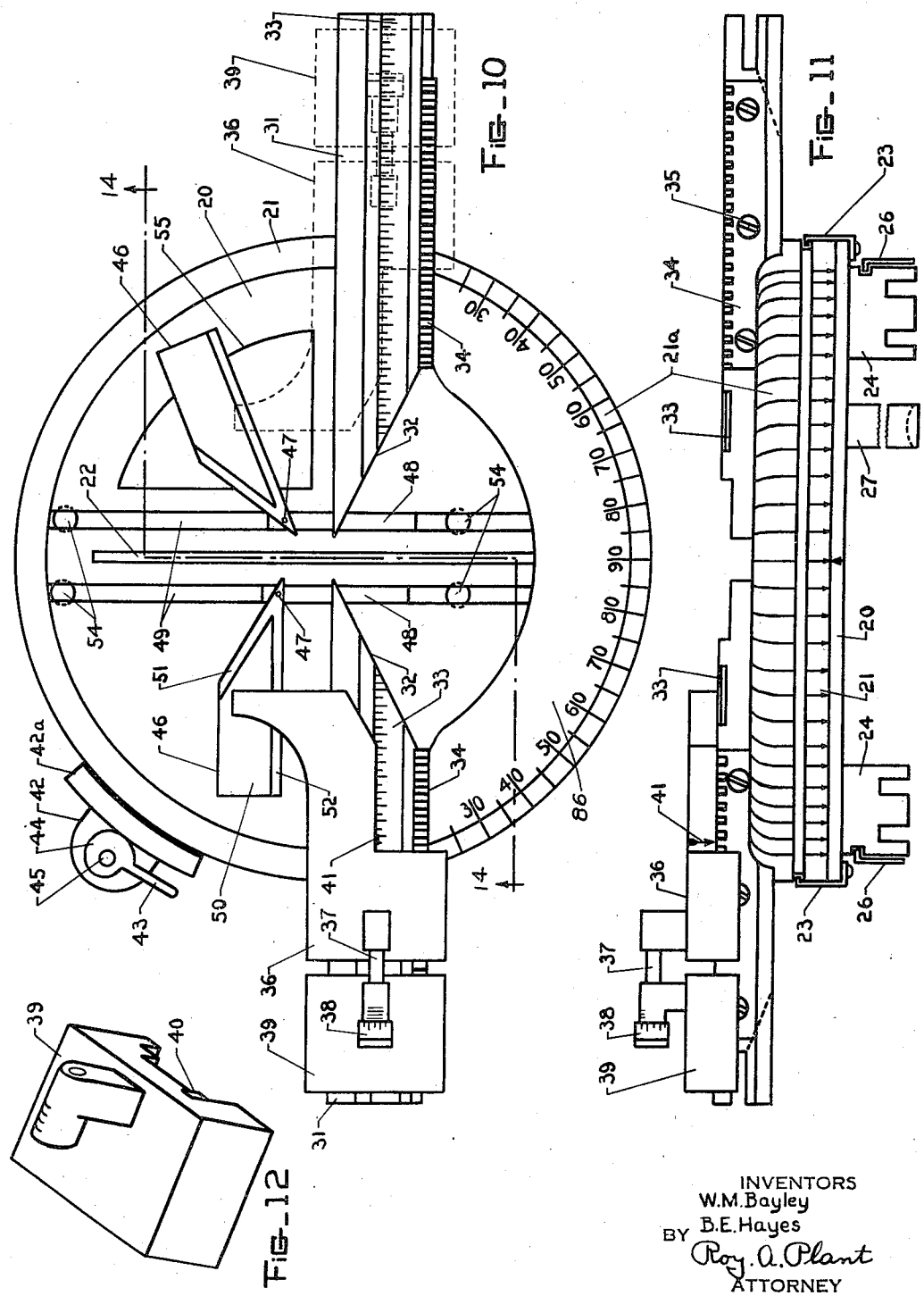

Patented July 9, 1940

2,207,370

UNITED STATES PATENT OFFICE 2,207,370

UNIVERSAL SAWING AND MITER CUTTING MACHINE

Willard M. Bayley and Ben E. Hayes, Battle Creek, Mich.; said Hayes assignor to said Bayley Application June 14, 1937, Serial No. 148,063

17 Claims. (Cl. 29—69)

The present invention relates broadly to sawing and miter cutting machines and in its specific phases to machines adapted for use in print shops, or the like, for square cutting, angle cutting, and decorative cutting of material such as printers' rules and border slugs.

In the past, several machines have been devised for use in print shops, one of the earliest being that of Richard Atwater which is described in his Patent No. 400,818 of April 2, 1889. This machine had a rotary table with slots in its face for use in bolting thereon the material to be cut. The material to be cut while mounted on the table was then forced by means of a hand wheel mechanism and cable up against a hand cranked, fixed location, saw. This procedure obviously is not only slow and tedious, but puts a burr on the primary edge of the material being cut so that an extra operation to remove the burr is necessary before the piece can be used for printing, or the like. Moreover, the piece to be cut is not cut in two, since the saw cannot cut all the way down to the table, and hence a separate cutting step is necessary in addition to the removal of the tag ends left by the first cut. Since the Atwater invention was devised, several other machines have been patented, but all of such machines have had various limitations. Among such limitations is the use of a saw mounted in a fixed location in manner producing the undesirable burr, the use of complex clamping mechanisms, and the use of cranks as the only means of carrying the work to be cut past the saw. Other so-called mitering machines merely use a V-edged cutter adapted for notching or cutting a thin printers' rule or border slug in two in manner such that the cut end will have a 45 degree angle. Such a machine is limited to the one angle of the cutting edge of the V-edged cutter and also to the cutting of a very small amount of material at a time, normally only one piece. In view of the shortcomings and lack of flexibility of the prior machines used in print shops, the present invention has been devised to produce a machine which is exceptionally safe to operate, not limited to a specified angle of mitering, and one which is very flexible and rapid in operation.

Accordingly, among the objects of the present invention is the provision of a vertically movable saw which may be operated either by foot or hand.

Another object of the invention is the provision of a table having a bed member adapted for forward and back movement, and a rotary work supporter mounted thereon.

Another object of the invention is the provision of a mechanism adapted to receive long material to be miter cut and permit its being so cut either at the end or some intermediate point of the ends at any angle within the range of approximately 90 degrees (square cut) to 30 degrees or less in either direction.

Another object of the invention is the provision of a mechanism wherein printers' rules or border slugs may be cut so as to eliminate the presence of a burr on the primary or printing surface.

Another object is the provision of a work backstop, with measuring gauge, mounted on the rotary work supporter and extending in a straight line across said work supporter, with the face of the backstop preferably located approximately in vertical line with the center of the saw axis, the work backstop being provided with a cross-wise opening for the passage of the saw.

Another object of the invention is the provision of a removable extension member, with measuring gauge, adapted to be attached to either end of the work backstop.

A further object of the invention is the provision of a hand lever for lowering the saw, such hand lever being adapted to remain stationary except when hand operated.

A further object of the invention is the provision of finger grippers mounted on the bed member on opposite sides of the saw receiving slot therein. These finger grippers are preferably pivoted at the end adjacent the saw and are mounted on members slidable in grooves on the bed of the machine.

A further object of the invention is the provision of a crank including mechanism for running the bed member and its allied parts forward and back.

A further object is the provision of means for releasing the crank mechanism so that the bed may be freely pushed forward and back by hand for rapid sawing action.

A further object is the provision of a protected gauge mounted on the upper face of the work backstop of the rotary work supporter.

A further object is the provision of an end backstop for the material to be cut, the mechanism used for positioning the end backstop being provided with a calibrated micrometer mechanism enabling the adjustment of the end backstop by picas, nonpareils, and points.

A further object is the provision of a removable rack on the work backstop, backstop extension, and on the micrometer carrying anchor member of the end backstop.

A still further object is the provision of a depth gauge in combination with an adjustable means for stopping the saw at a desired depth of cut.

A still further object is the provision of a saw guard, part of which remains in fixed location to completely cover the saw in its upper position and another part of the saw guard attached to the saw carrier in manner such that it will be carried down with the saw and when in sawing position will prevent the operator's fingers from passing under such guard from the front of the machine.

Other objects and advantages will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In said annexed drawings:

Figure 1 is a side view of a partial assembly of one form of the invention.

Figure 2 is a front view of the mechanism shown in Figure 1.

Figure 3 is a top view of the work backstop extension.

Figure 4 is a center section through the circular bed member of the machine.

Figure 5 is a side view of a partial assembly of the upper portion of the machine showing the saw guard and adjustable depth cutting gauge.

Figure 6 is a front view of the mechanism shown in Figure 5.

Figure 7 is a top view of an adjustable angle auxiliary end backstop member.

Figure 8 is an edge view of the backstop member shown in Figure 7.

Figure 9 is an end view of a finger-operated work gripper.

Figure 10 is a top assembly view of the bed member, rotary work supporter, work backstop, and allied parts.

Figure 11 is a front edge view of the mechanism shown in Figure 10.

Figure 12 is an isometric view of the micrometer carrying anchor member for the end backstop.

Figure 13 is a diagrammatic assembly view of the hand lever and associated parts as seen from the back face of Figure 1.

Figure 14 is a section view taken on the line 14—14 of Figure 10.

The machine of the present invention, which may be in the form of a bench mounting or floor mounting machine, has a saw carrying head mounted for vertical motion responsive to hand operation, foot operation, or both, and directly below the saw a work table having a bed portion carrying a rotary work supporter with work backstop and allied parts. For vertical cutting, the axis of the saw is normally directly above or slightly back of the center of the work table, and for the cutting step is forced downward onto the top of the material to be cut so as to miter cut the prescribed angle according to the setting of the rotary portion of the work table. This vertical cutting prevents placing a burr on the upper edge of the piece being cut, the upper edge normally being the edge which is used for printing. In some cases, it may be desired to crosscut a piece of material, either for the partial depth of the piece, or its whole depth. Under these conditions, the saw may be set at its desired lower cutting position with the work table in its forward position. A suitable crank or the equivalent may be used for cranking the work table with work backstop carrying the material to be cut up against the cutting edge of the rotating saw. This is particularly advantageous where a piece of relatively hard material, such as brass, is to be cut. In some cases, where a relatively soft material, such as border slugs, is to be cut to specified approximate lengths, then the crank mechanism may be released and the table run freely by hand to pass the material to be cut up against the saw. The material may be held up against the work backstop in various ways during the cutting operation, but one that is exceptionally convenient consists of the guarded finger grippers illustrated in the drawings.

The table 1 of the sawing and miter cutting machine may be adapted for setting in portable manner on a bench, may be bolted thereto, or may be mounted on a pedestal 2 having a base 3. Mounted on the table 1, preferably near the back edge thereof, is a supporting member 4. On the forward or free end of said supporting member 4 is fastened a head member 5 which has slidably mounted thereon a saw carrier 6. The lower end of said saw carrier 6 is provided with suitable bearings 7 for saw shaft 8 which is provided with a circular saw 9 and a pulley 10. A belt 11, which is preferably of the V-type, connects pulley 10 to the driving pulley of motor 12, or equivalent source of power.

The saw carrier 6 is normally held in its uppermost position by any suitable means, such as a spring 13. The lowering of the saw carrier 6 to bring the circular saw 9 into cutting position may be accomplished in various ways, for instance, by means of a foot pedal 14, connecting link 15, gear 16, and pinion 17 in mesh with a rack 84 on saw carrier 6. By depressing foot pedal 14 (Figure 1), connecting link 15 will rotate gear 16 in an anti-clockwise direction, which in turn, will rotate pinion 17 in a clockwise direction, and which, by means of its engagement with a rack 84 on saw carrier 6 (Figure 13), will move saw carrier 6 and circular saw 9 in a downward direction to accomplish the desired cutting action. Where hand operation is desired with or without foot pedal operation, a hand lever 18 is provided which may be attached to pinion 17 in manner such that when the operator pulls hand lever 18 in a clockwise direction (Figure 1) toward himself, pinion 17 will be rotated to move circular saw 9 down into cutting position. Where foot pedal operation is to be also used, it is preferable to construct hand lever 18 so that it will remain in its back position against a suitable stop 80 at all times except when the operator wishes to use same. This may be accomplished in various well-known ways, for instance, hand lever 18 may be provided with a ratchet mechanism which engages for rotative purposes only when latch operator 19 is pulled toward the end of hand lever 18. Referring to Figure 13, latch operator 19 on handle 18 is connected to a conventional pivoted latch dog 81 adapted to engage ratchet gear 82 which is made a part of or fastened to the side of pinion 17. Spring 83, or the equivalent thereof, acts to prevent engagement of latch dog 81 with ratchet gear 82 except when latch operator 19 is gripped against the end of handle 18. The gripping of latch operator 19 against the end of handle 18 will cause latch dog 81 to engage ratchet gear 82, and upon anti-clockwise movement of handle 18, gear 17 will rotate and through its engagement with rack 84 on saw carrier 6 will move the latter and circular saw 9 in a downward direction. Spring 13 will return the saw to its upper position when handle 18 is returned to starting position.

Mounted on table 1 is a circular bed member 20 which carries rotary work supporter 21 mounted thereon, said circular bed member 20 being provided with a saw receiving slot 22 (Figure 10) in line with the edge of the saw. The circular bed member 20 and rotary work supporter 21 are preferably fastened together in conventional manner permitting relative rotation. One convenient construction for accomplishing this purpose consists of clips 23 (Figure 11) which are adapted to hold the bed member 20 and rotary work supporter 21 together while permitting rotation of the latter. This rotation is facilitated by providing circular bed member 20 with a circumferential ledge 85 (Figures 4 and 14) on which rotary work supporter 21 is adapted to rotatably fit with its upper edge flush with the top of circular bed member 20. Member 86 is joined to the upper edge of rotary work supporter 21 for rotation above circular bed member 20 and has its front edge 21a suitably calibrated for guidance in angular cutting of border slugs or other material. Where only cutting due to vertical motion of the rotating saw 9 is desired, the circular bed member 20 may, if desired, be fastened directly in place on table 1. In some cases, however, it may be desirable to saw material while the circular saw 9 is held in lowered position, and to accomplish this, the circular bed member 20 may be provided with guide ways 24 adapted to engage with guide ways 25 on the upper face of table 1 (Figure 2). Clips 26 (Figure 11) may be used to hold guide ways 24 and 25 in close fitting engagement while permitting endwise motion of one over the other. Guide ways 24 and 25 may be considered as diagrammatically showing either a fixed or movable mounting for circular bed member 20. To permit uniform forward and back movement of circular bed member 20, a rack member 27 may be attached to the lower edge of same, and, in turn, engage with a suitable operating mechanism of conventional construction mounted on table 1 and actuated by crank 28. This rack and operating mechanism also acts to lock the bed member 20 and allied parts mounted thereon in place, except when same is disengaged or crank 28 operated.

Where it is desired to have the circular bed member 20 and the parts carried thereby freely movable in a forward and back direction for rapid sawing action, the crank 28 and its connected mechanism may be provided with a quick release mechanism of conventional construction, for instance, a hinge 29 and a latching stud 30 which may be provided with wings or knurling for ease of operation.

Mounted on the upper face of rotary work supporter 21 is a work backstop 31 (Figure 10). This work backstop 31 is preferably so located that the face of same, against which the material to be cut is placed, will be approximately on or slightly in front of the center line of rotary work supporter 21. The inner ends 32 of the work backstop 31 are preferably cut away at a wide angle to permit clearance of the saw when rotary work supporter 21 is rotated for miter cutting at angles other than 90 degrees. The upper edge of the work backstop 31 is provided with a measuring gauge 33, preferably calibrated in picas and nonpareils. The measuring gauge may be flush with the upper surface of work backstop 31, but in preferred construction, it is slightly depressed to avoid wear due to direct contact with end backstop member 36 and other parts adapted for mounting on work backstop 31. The front edge of the work backstop 31 is provided with a rack 34, preferably mounted for quick removal and replacement, for instance, by means of screws 35. This feature permits the easy renewal of a broken or worn rack without having to replace other parts of the machine at the same time.

Mounted on the work backstop 31 is an endwise movable end backstop member 36 (Figures 10 and 11). Attached to the end backstop member 36 by means of a mechanism including a shaft 37 and micrometer mechanism 38 is an anchoring member 39. This anchoring member 39 is provided with a rack 40 adapted to engage with rack 34 on the edge of work backstop 31. A pointer 41, or its equivalent, is preferably mounted on the edge of end backstop member 36 where it will point to the graduations on measuring gauge 33 which is preferably calibrated to indicate at the point of the arrow exactly the number of picas or nonpareils that the end of the end backstop member 36 is removed from the adjacent side of the circular saw 9. The micrometer mechanism 38 is preferably calibrated in points, nonpareils, and picas. One complete rotation of the head of the micrometer, for instance, will move end backstop member 36 twelve points or one pica. This predetermined movement is easily accomplished by providing shaft 37 with threads which run six to the inch, since six picas make one inch. Another end work backstop mechanism of equivalent construction may be used on work backstop 31 on the opposite side of the circular saw 9 from that shown, but for simplicity of understanding the invention, and to avoid duplication of showing end backstop details and covering of other details, the second end work backstop has been shown only in dotted outline.

The front edge 21a of the rotary work supporter 21 may be suitably calibrated so as to show at a glance the exact angle that the rotary work supporter 21 has been turned in either direction for miter cutting purposes.

In order to hold the rotary work supporter in desired location against further rotation until reset, any conventional holding means may be utilized, for instance, a friction gripper 42 mounted on circular bed member 20 and adapted to frictionally contact, by means of friction shoe 42a, the edge of rotary work supporter 21. Any suitable means may be provided for supplying the gripping pressure, for instance, a lever 43 carrying a cam 44 and mounted on a bearing member 45.

To facilitate holding the work to be cut against the work backstop 31, work grippers 46 (Figures 9 and 10) are provided. These work grippers 46 are preferably pivoted at 47 to sliding shoe members 48 adapted to slide in slots 49 of circular bed member 20. The sliding shoe members 48 and slots 49 are preferably of such shape that the shoe member will not be vertically removable. One of the many convenient shapes especially adapted for this purpose is one which has the form of a frustum of an isosceles triangle. Slots 49 suited to fit such shoe members are illustrated in Figure 4. As shown in Figures 9 and 10, the work grippers 46 are preferably provided with a bottom member 50, an end member 51, and a side member 52. The side member 52 may also be provided with a recess 53 into which the ends of the operator's finger nails may pass to give him a better grip. The height of end member 51 and side member 52 is such as to permit the gripper 46 to pass under end backstop member 36. The use of grippers 46 of the construction shown permits rapid operation, and at the same time, provides in end member 51 and side member 52 a barrier to prevent the operator's fingers from accidentally slipping up against the saw. To facilitate the removal of saw cuttings from slots 49, they may be provided with a series of openings 54 through which the saw cuttings may drop. If desired, the circular bed member 29 may also be provided with an opening 55 through which saw cuttings may be brushed from the top thereof.

A work backstop extension 56 (Figures 2 and 3) may be used to facilitate the handling of long printers' rules or border slugs. A separate extension member for each end of the work backstop 31 may be provided, but for most purposes a single extension with ends adapted to fit either end of the work backstop 31 may be utilized. A top view of such a work backstop extension is shown in Figure 3. On its upper face is provided a gauge 72 which is preferably calibrated in both directions in picas and nonpareils, so as to make a continuous reading with measuring gauge 33 on work backstop 31. The edge of the extension is provided with a rack 57 which is continuous with rack 34 on backstop 31. Many forms of construction are usable for joining the extension to the end of the work backstop 31, but one convenient form consists of the tongue and groove construction illustrated.

Where it is desired to simultaneously miter cut a number of pieces of printers' rules or border slugs at an angle other than 90 degrees and at the same time have all of the pieces being mitered of the same length, an auxiliary backstop member 58 (Figures 7 and 8) is used. In use the rotary work supporter 21 is first turned to the desired mitering angle, and then the auxiliary backstop member 58 is placed on top of work backstop 31 adjacent the end of end backstop member 36 and slid forward until it contacts the side of circular saw 9 in its lowered position. Knob 61 is then rotated to bring movable member 60 attached thereto up against and parallel with the side of the circular saw 9. The auxiliary backstop member 58 may then be slid back on work backstop 31 into contact with the end of end backstop member 36 which may be adjusted to the desired point for cutting the border slugs, or the like. Any suitable means may be provided for holding movable member 60 in position after it has been once set. One convenient means of accomplishing this consists of a knob 73 which may be tightened down to hold movable member 60 in fixed location.

As shown in Figures 5 and 6, the machine is preferably provided with a guard mechanism for the saw. This guard mechanism may be of various forms, but one convenient form for use consists of a fixed guard member 62 mounted on supporting member 4. A movable guard member 63 is preferably mounted on the vertically movable saw carrier 6 in manner such that as the saw is lowered to cutting position, the movable guard 63 will be carried down in front of the saw, and when the saw is in its lower-most position will be so close to the top of the front portion of rotary work supporter 21 that the opening will be too small for the operator's fingers to pass therethrough. The operator, however, will be able to see around the movable guard 63 and hence have visual control of the cutting operation.

The electric motor 12 and the circular saw 9 may be variously positioned relative to each other. For instance, as shown in Figure 1, the motor may be located so as to be practically in a horizontal line with the saw 9 when it is in its lower-most or cutting position. Under these conditions, if desired, a belt tightener 64 may be used. Another form of construction, shown in Figure 5, is one wherein the motor 12 is set with its center approximately in horizontal line with the mid-point of travel of the saw 9 between its upper-most and lower-most positions. This type of construction presents the advantage of having the belt tightest when the circular saw 9 is in its sawing position. For convenience of operation, an electric motor switch 65 is used.

Where it is desired to merely notch or groove to a specified depth a printers' rule, border slug, or the like, a depth gauge may be used. One of the many convenient forms of depth gauges adapted for this purpose consists of an angular member 66 (Figures 5 and 6) having a slot 67 and a stop member 68 adapted to contact the upper end of head member 5. A gripping nut 69 is adapted to be tightened to clamp the angular member 66 in fixed position against the front face of saw carrier 6. A suitable pin or roller 70 may be used to hold angular member 66 in an upright position. The depth of cut may be judged directly by the operator, or he may use a suitable gauge and pointer mechanism 71 to tell him exactly how deep a cut he is going to make.

Several of the ways that the sawing and miter cutting machine may be operated are as follows: In making a square cornered box, the rotary work supporter is first turned and fastened in the position coinciding with the angle (45 degrees) that the border slug is to be miter cut. End backstop member 36 is then set for the length that the border slug is to be cut. The border slug is then placed on edge against the face of work backstop 31 with printing edge up and the work gripper 46 gripped up against the opposite side of the border slug by placing the fingers against the inner face of side member 52 of the work gripper 46 and holding same tightly against the piece to be mitered. Electric switch 65 is operated to start the motor and then foot pedal 14 depressed, or hand lever 18 pulled forward, to bring the rotating circular saw 9 downward and through the border slug to give it the desired miter cut end without a burr on its upper edge. The rotary work supporter 21 is then turned to bring the other 45 degree mark on front edge 21a of rotary work supporter 21 in registry with the arrow on the front edge of circular bed member 20. The rotary work supporter 21 is then fastened in place by any suitable means, such as friction gripper 42. The border slug is then reversed and the previously miter cut end placed up against the end of end work backstop 36 in manner such that when the saw is again brought down on the same edge of the other end of the border slug, it will be miter cut at the desired angle and on the proper side. If a series of border slugs are to be miter cut in unison, then auxiliary end backstop member 58 is used in manner previously described, to cause all the pieces to be of the same length when the miter cutting of the second end is completed. Shadow boxes may be made in like manner except that the cut is only made part way down the end of the border slug in manner permitting the balance of the end of the slug to be of solid square-end construction adapted to be locked up with another square end slug for the adjacent side of the box which will permit tight clamping of the assembly for printing purposes without crushing the thin edge at the joining corner of the slugs, a difficulty which is almost universally prevalent at the present time.

Other modes of applying the principle of our invention may be employed instead of those explained, change being made as regards the mechanism herein disclosed, provided the means stated by any of the following claims or the equivalent of such stated means be employed.

We therefore, particularly point out and distinctly claim as our invention:

1. A machine of the character described which has a saw mounted on a carrier adapted for non-rotative vertical movement, means to vertically move said carrier and saw, a work table mounted below said saw and in operable relation therewith, said table being adapted for both free and controlled forward and back movement, a rotary work supporter mounted on said work table and adapted for limited angular rotation thereon, means for joining said work table and rotary work supporter while permitting the latter to rotate on the former, and locking means for holding said rotary work supporter in fixed position relative to said work table.

2. A machine of the character described which has a saw mounted on a carrier adapted for non-rotative vertical movement, means to vertically move said carrier and saw, an adjustable stop means adapted to control the extent of lowering the saw, a work table mounted below said saw and in operable relation therewith, said table being adapted for both free and controlled forward and back movement, a rotary work supporter mounted on said work table and adapted for limited angular rotation thereon, a work backstop mounted on said rotary work supporter, and means on said rotary work supporter and said work table to show the angular setting of the rotary work supporter on the work table.

3. A machine of the character described which has a saw mounted on a carrier adapted for non-rotative vertical movement, means to vertically move said carrier and saw, a work table mounted below said saw and in operable relation therewith, a work backstop mounted on said table, and at least one work gripper mounted on said work table for gripping the material to be cut against the work backstop, a groove in the top of the work table substantially parallel to the face of the saw, and a member slidably fitting said groove, said work gripper being pivotally mounted at its end adjacent the saw on said slidable member.

4. In a machine of the character described, the combination which includes a circular saw, a non-rotatable vertically movable saw carrier, a horizontal shaft mounted on said carrier and having said saw fastened thereto for rotation therewith, means for normally holding said saw and saw carrier in upper position, a foot operated means for lowering said saw carrier and saw into cutting position, a hand-operated means for lowering said saw carrier and saw into cutting position, means in connection with said hand-operated handle whereby same remains substantially motionless during foot operated vertical movement of the saw carrier and saw, and a latch operator mechanism mounted on said handle for use in operatively engaging same to lower said saw into cutting position.

5. In a machine of the character described, the combination which includes a circular saw, a non-rotatable vertically movable saw carrier, a horizontal shaft mounted on said carrier and having said saw fastened thereto for rotation therewith, means for normally holding said saw and saw carrier in upper position, a foot operated means for lowering said saw carrier and saw into cutting position, a hand-operated means for lowering said saw carrier and saw into cutting position, means in connection with said hand-operated handle whereby same remains substantially motionless during foot operated vertical movement of the saw carrier and saw, and a latch with latch operator mechanism mounted on said handle for use in operatively engaging same to lower said saw into cutting position, and a guard for said saw.

6. In a sawing machine, the combination of a saw member mounted on a vertically movable saw carrier, a circular bed member with a saw receiving slot in the path of movement of the saw, a rotary work supporter mounted on the circumference of said bed member for rotation thereon, a work backstop extending across the top of the rotary work supporter, but cut away at the path of movement of the saw to permit the passage of the saw therethrough, and gripping means for gripping the material to be cut against the work backstop on either side of its cut away portion.

7. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, slots in the upper face of said bed member approximately parallel to the saw slot, and gripping means mounted on members slidably fitting said slots in the bed member.

8. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, at least one slot in the upper face of said bed member approximately parallel to the saw slot, and a finger gripping means with guard mounted on a member slidably fitting said slot in the bed member.

9. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, at least one slot in the upper face of said bed member approximately parallel to the saw slot, a gripping means mounted on a member slidably fitting said slot in the bed member, a table below said bed member, and means for joining said bed member to said table.

10. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, slots in the upper face of said bed member approximately parallel to the saw slot, separate gripping means, each mounted on a member slidably fitting one of said slots in the bed member, a table below said bed member, means for joining said bed member to said table in manner permitting movement of the bed member forward and back in line with the saw, and means including a crank for moving said bed member forward and back.

11. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, slots in the upper face of said bed member approximately parallel to the saw slot, separate gripping means with mounting, the said mounting member of each gripping means slidably fitting one of said slots in the bed member, a table below said bed member, means for joining said bed member to said table in manner permitting movement of the bed member forward and back in line with the saw, means including a crank for moving said bed member forward and back, and means for disengaging said bed member moving mechanism in manner permitting the bed member with the rotary work supported and allied parts to be freely moved forward and back.

12. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, slots in the upper face of said bed member approximately parallel to the saw slot, a gripping means with slidable mounting member for each of said slots in the bed member which are approximately parallel to the saw slot, a table below said bed member, means for joining said bed member to said table in manner permitting movement of the bed member forward and back in line with the saw, means including a crank for moving said bed member forward and back, means for disengaging said bed member moving mechanism in manner permitting the bed member with the rotary work supporter and allied parts to be freely moved forward and back, and a supporting member mounted on said table and carrying a head member which cooperates with said saw carrier in permitting same to be moved to and from the bed member.

13. In a machine for miter cutting printers' rules and border slugs, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter but cut away at a wide angle in the path of movement of the saw to permit the passage of the saw therethrough, an extension for said work backstop, an end backstop mounted on said work backstop, an adjustable auxiliary end backstop member mounted on said work backstop, two slots in the upper face of said bed member approximately parallel to the saw slot and on opposite sides thereof, a gripping means with slidable mounting member for each of said slots in the bed member which are approximately parallel to the saw slot, a table below said bed member, means for joining said bed member to said table in manner permitting movement of the bed member forward and back in line with the saw, means including a crank for moving said bed member forward and back, means for disengaging said bed member moving mechanism in manner permitting the bed member with rotary work supporter and allied parts to be freely moved forward and back, and a supporting member mounted on said table and carrying a head member which cooperates with said saw carrier in permitting same to be moved to and from the bed member.

14. In a machine of the character described, the combination which includes a saw, a vertically movable saw carrier, means for normally holding said saw and saw carrier in upper position, a foot operated means for lowering said saw carrier and saw into cutting position, a hand operated means for lowering said saw carrier and saw into cutting position, means in connection with said hand operated handle whereby same remains substantially motionless during foot operated vertical movement of the saw carrier and saw, means on said handle such that when same is gripped for movement of the handle it automatically engages the handle for lowering the saw into cutting position, a circular bed member with a saw receiving slot in the path of movement of the saw, a rotary work supporter mounted for rotation on said bed member, and a work backstop extending across the top of the rotary work support, but cut away in the path of movement of the saw to permit the passage of the saw therethrough.

15. In a machine of the character described, the combination which includes a saw, a vertically movable saw carrier, means for normally holding said saw and saw carrier in upper position, a foot operated means for lowering said saw carrier and saw into cutting position, a hand operated means for lowering said saw carrier and saw into cutting position, means in connection with said hand operated handle whereby same remains substantially motionless during vertical movement of the saw carrier and saw except when same is hand operated, a circular bed member with a saw receiving slot in the path of movement of the saw, a rotary work supporter mounted for rotation on said bed member, a work backstop extending across the top of the rotary work support, but cut away in the path of movement of the saw to permit the passage of the saw therethrough, at least one slot in the upper face of said bed member approximately parallel to the saw slot, and a gripping means mounted on a member slideably fitting said slot in the bed member.

16. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, a rack mounted on said work backstop, an end backstop member mounted on said work backstop, an anchoring member mounted on said work backstop, a rack fastened to said anchoring member and adapted to engage with the rack on said work backstop in manner preventing the anchoring member from moving endwise on said work backstop, and an adjustable means for connecting said anchoring member to said end backstop member.

17. In a sawing machine, the combination of a saw member mounted on a vertically movable saw carrier, a circular bed member with a saw receiving slot in the path of movement of the saw, a rotary work supporter mounted for rotation on said bed member, a work backstop extending across the top of the rotary work supporter, but cut away at the path of movement of the saw to permit the passage of the saw therethrough, a rack mounted on said work backstop, an end backstop member mounted on said work backstop, an anchoring member mounted on said work backstop, a rack fastened to said anchoring member and adapted to engage with the rack on said work backstop in manner preventing the anchoring member from moving endwise on said work backstop, an adjustable means for connecting said anchoring member to said end backstop member, a graduated scale on said work backstop and adapted to cooperate with the end backstop member to indicate the distance that same is spaced from said saw when the latter is in its cutting position, and means to indicate the angular setting of the work backstop relative to the plane of the saw.

WILLARD M. BAYLEY.
BEN E. HAYES.